United States Patent [19]

Inoue

[11] Patent Number: 5,254,657
[45] Date of Patent: Oct. 19, 1993

[54] RTV SILICONE RUBBER COMPOSITIONS AND CURED PRODUCTS THEREOF

[75] Inventor: Yoshio Inoue, Annaka, Japan

[73] Assignee: Shin-Etsu Chemical Co., Ltd., Tokyo, Japan

[21] Appl. No.: 891,122

[22] Filed: Jun. 1, 1992

[30] Foreign Application Priority Data

May 30, 1991 [JP] Japan .................... 3-153681
Jun. 3, 1991 [JP] Japan .................... 3-160074

[51] Int. Cl.$^5$ ............................................. C08G 77/08
[52] U.S. Cl. ............................... 528/17; 528/18; 528/34; 528/38; 528/41
[58] Field of Search .............. 528/34, 38, 41, 17, 528/18

[56] References Cited

U.S. PATENT DOCUMENTS

| | | | |
|---|---|---|---|
| 3,208,971 | 9/1965 | Gilkey et al. | 528/41 |
| 3,878,168 | 4/1975 | Schank | 528/34 |
| 4,506,058 | 3/1985 | Ashby et al. | 524/730 |
| 4,877,828 | 10/1989 | Stein et al. | 524/728 |
| 4,959,407 | 9/1990 | Rich et al. | 524/425 |
| 5,091,483 | 2/1992 | Mazurek et al. | 525/477 |

*Primary Examiner*—Melvyn I. Marquis
*Assistant Examiner*—Margaret W. Glass

[57] ABSTRACT

A room temperature vulcanizable silicone rubber composition is provided, comprising (A) an organopolysiloxane containing at least one amino group represented by —$R^1NH_2$ in a molecule and having a viscosity of from 25 to 500,000 cst at 25° C. wherein $R^1$ is a divalent $C_{1-20}$ hydrocarbon group or a divalent $C_{1-20}$ organic group containing an ether bond or —NH— bond, (B) an organic silicon compound of the formula: OCNR$^2$SiR$_a^3$X$_{3-a}$ wherein $R^2$ has the same meaning as $R^1$, $R^3$ is a monovalent $C_{1-10}$ hydrocarbon group, X is an alkoxy, ketoxime, alkenyloxy or acyloxy group, and a is 0 or 1, and (C) a curing catalyst. The composition cures at room temperature, providing a product having improved heat resistance, weather resistance and adhesion.

7 Claims, No Drawings

RTV SILICONE RUBBER COMPOSITIONS AND CURED PRODUCTS THEREOF

This invention relates to room temperature vulcanizable silicone rubber compositions suitable for use as sealants in buildings, adhesive attachment, coating and potting of electric and electronic parts, seals in automobile engines, adhesives, and the like as well as cured products of the compositions.

BACKGROUND OF THE INVENTION

Most of room temperature vulcanizable (RTV) silicone rubber compositions are of one-part type and contained in tubes or cartridges as commercially available products so that the silicone rubber may be used simply by extruding the rubber from the container and allowing the rubber to cure with moisture in air. RTV silicone rubber compositions can firmly adhere to various supports and are resistant against heat and weathering. For these and other reasons, RTV silicone rubber compositions have found versatile applications in a wide variety of industrial fields including electric, electronic, building, automobile and business machine industries.

De-alcoholysis type silicone rubber compositions which form one typical class of RTV silicone rubber compositions slowly cure at room temperature. Curing can be accelerated by increasing the amount of a curing catalyst. However, if the amount of curing catalyst added is increased beyond an ordinary level, the composition in uncured state becomes less stable during shelf storage and cured products become less desirable in heat resistance, weather resistance and adhesion.

SUMMARY OF THE INVENTION

Therefore, a primary object of the present invention is to provide a novel and improved RTV silicone rubber composition which can reasonably cure at room temperature into a product having satisfactory heat resistance, weather resistance and adhesion. Another object of the present invention is to provide a cured product of such a composition.

The inventor has found that when (A) an organopolysiloxane containing at least one amino group represented by $-R^1NH_2$ in a molecule and having a viscosity of from 25 to 500,000 centistokes at 25° C. wherein $R^1$ is a substituted or unsubstituted divalent hydrocarbon group having 1 to 20 carbon atoms or a divalent organic group having 1 to 20 carbon atoms and containing an ether bond, ester bond or —NH— bond, is blended with (B) an organic silicon compound of the formula: $OCNR^2SiR_a^3X_{3-a}$ wherein $R^2$ is as defined for $R^1$, $R^3$ is a substituted or unsubstituted monovalent hydrocarbon group having 1 to 10 carbon atoms, X is an alkoxy group, ketoxime group, alkenyloxy group or acyloxy group, and letter a is equal to 0 or 1, preferably in such amounts that the molar ratio of isocyanate group in component (B) to amino group in component (A) may be at least 0.1, components (A) and (B) react with each other to form a ureido linkage represented by $-R^1NHCONHR^2SiR_a^3X_{3-a}$, resulting in a composition based on an organopolysiloxane having a hydrolyzable group introduced therein. By further blending (C) a curing catalyst in this composition, there is obtained a composition having satisfactory room temperature curing ability. This composition cures into a silicone rubber having improved heat resistance, weather resistance and adhesion.

Further, the inventor has also found that, instead of using the above components (A) and (B) in combination, by using (A') an organopolysiloxane containing at least one group represented by the following formula:

$$-R^1NHCONHR^2SiR_a^3(OR^6)_{3-a}$$

wherein $R^1$ and $R^2$ are independently selected from substituted or unsubstituted divalent hydrocarbon groups having 1 to 20 carbon atoms and divalent organic groups having 1 to 20 carbon atoms and containing an ether bond, ester bond or —NH— bond, $R^3$ and $R^6$ are independently selected from substituted or unsubstituted monovalent hydrocarbon groups having 1 to 10 carbon atoms, and letter a is equal to 0 or 1, in a molecule, and combining the above organopolysiloxane with (C) a curing catalyst, there is also obtained a composition having satisfactory room temperature curing ability and curing into a silicone rubber having improved heat resistance, weather resistance and adhesion.

Accordingly, the present invention provides a RTV silicone rubber composition comprising (A) an organopolysiloxane containing at least one amino group represented by $-R^1NH_2$ in a molecule and having a viscosity of from 25 to 500,000 centistokes at 25° C. wherein $R^1$ is a substituted or unsubstituted divalent hydrocarbon group having 1 to 20 carbon atoms or a divalent organic group having 1 to 20 carbon atoms and containing an ether bond or —NH— bond, (B) an organic silicon compound of the formula: $OCNR^2SiR_a^3X_{3-a}$ wherein $R^2$ is as defined for $R^1$, $R^3$ is a substituted or unsubstituted monovalent hydrocarbon group having 1 to 10 carbon atoms, X is an alkoxy group, ketoxime group, alkenyloxy group or acyloxy group, and letter a is equal to 0 or 1, and (C) a curing catalyst.

The present invention also provides a RTV silicone rubber composition comprising (A') an organopolysiloxane containing at least one group represented by the following formula:

$$-R^1NHCONHR^2SiR_a^3(OR^6)_{3-a}$$

wherein $R^1$ and $R^2$ are independently selected from substituted or unsubstituted divalent hydrocarbon groups having 1 to 20 carbon atoms and divalent organic groups having 1 to 20 carbon atoms and containing an ether bond, ester bond or —NH— bond, $R^3$ and $R^6$ are independently selected from substituted or unsubstituted monovalent hydrocarbon groups having 1 to 10 carbon atoms, and letter a is equal to 0 or 1, in a molecule, and (C) a curing catalyst.

The present invention further provides a cured product obtained by curing the silicone rubber composition defined above.

DETAILED DESCRIPTION OF THE INVENTION

Briefly stated, the RTV silicone rubber composition of the present invention includes (A) an organopolysiloxane, (B) an organic silicon compound and (C) a curing catalyst as essential components, or (A') an organopolysiloxane and (C) a curing agent as essential components.

Component (A) is an organopolysiloxane containing at least one amino group represented by $-R^1NH_2$ in a molecule.

$R^1$ is a substituted or unsubstituted divalent hydrocarbon group having 1 to 20 carbon atoms, preferably 1 to 6 carbon atoms or a divalent organic group having 1 to 20 carbon atoms, preferably 1 to 6 carbon atoms and containing an ether bond, ester bond or —NH— bond. Examples of the substituted or unsubstituted divalent $C_{1-20}$ hydrocarbon group include —$CH_2$—, —$CH_2CH_2$—, —$CH_2CH_2CH_2$—,

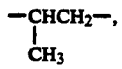

—$CH_2CH_2CH_2CH_2CH_2$—, —$CH_2CH_2CH_2CH_2CH_2CH_2CH_2$—, and —$C_6H_4$—. Examples of the divalent $C_{1-20}$ organic group containing an ether or ester bond include —$CH_2CH_2OCH_2CH_2CH_2$—, —$CH_2CH_2OCH_2CH_2OCH_2CH_2$—, —$CH_2COOCH_2CH_2OCOCH_2$—, and —$CH_2COO(CH_3)CHOCOCH_2$—. Examples of the divalent $C_{1-20}$ organic group containing a —NH— bond include —$CH_2CH_2NHCH_2CH_2$— and —$CH_2CH_2NHCH_2CH_2NHCH_2CH_2$—.

The organopolysiloxanes may be linear, branched or cyclic although linear organopolysiloxanes are preferred for cured silicone rubber to exhibit better properties. The amino group may be attached to the molecule either at the end or at a side chain although attachment of amino at the molecular end is preferred for silicone rubber compositions to have desirable room temperature curing ability.

The organopolysiloxanes should have a viscosity of from 25 to 500,000 centistokes (cst) at 25° C., preferably from 1,000 to 100,000 cst at 25° C.

More particularly, organopolysiloxanes of the following formula are preferred as component (A).

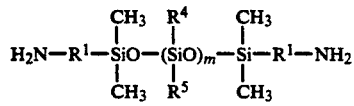

In the formula, $R^1$ is as defined above, and $R^4$ and $R^5$ are independently selected from substituted or unsubstituted monovalent hydrocarbon groups having 1 to 20 carbon atoms, preferably 1 to 8 carbon atoms, for example, alkyl groups such as methyl, ethyl, propyl and butyl groups, alkenyl groups such as vinyl and allyl groups, aryl groups such as phenyl and tolyl groups, cycloalkyl groups such as a cyclohexyl group, aralkyl groups such as benzyl and phenethyl groups, and substituted ones of these groups wherein some or all of the hydrogen atoms attached to carbon atoms are replaced by halogen atoms, cyano groups or the like, such as a trifluoropropyl group. Letter m is an integer of at least 5, especially from 100 to 2,000.

Examples of the organopolysiloxane (A) are described below. Those organopolysiloxanes containing an amino group at either end are first exemplified.

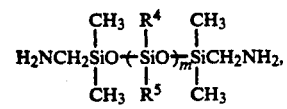

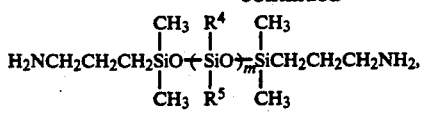

Below are exemplary organopolysiloxanes containing an amino group at a side chain.

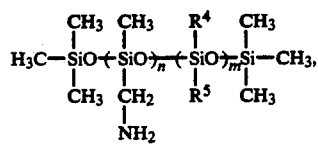

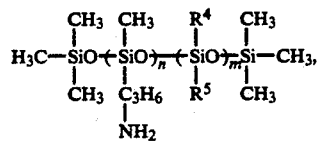

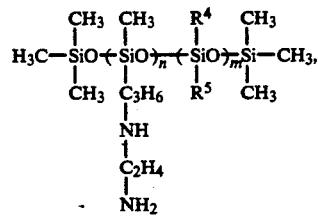

Component (B) is an organic silicon compound containing an isocyanate group. The compound is of the formula:

wherein $R^2$ is as defined for $R^1$, $R^3$ is a substituted or unsubstituted monovalent hydrocarbon group having 1 to 10 carbon atoms, preferably 1 to 8 carbon atoms, for example, alkyl groups such as methyl, ethyl and propyl groups, alkenyl groups such as vinyl and allyl groups, aryl groups such as phenyl and tolyl groups, cycloalkyl groups such as a cyclohexyl group, aralkyl groups such as benzyl and phenethyl groups, and substituted ones of these groups wherein some or all of the hydrogen atoms attached to carbon atoms are replaced by halogen atoms, cyano groups or the like, such as a trifluoropropyl group.

X is a hydrolyzable group selected from the group consisting of alkoxy groups preferably having 1 to 8 carbon atoms (e.g., methoxy, ethoxy, propoxy, butoxy, methoxyethoxy and ethoxyethoxy groups), ketoxime groups preferably having 3 to 12 carbon atoms (e.g., dimethylketoxime, methylethylketoxime, diethylketoxime, cyclopentanoxime, and cyclohexanoxime groups), alkenyloxy group preferably having 2 to 8 carbon atoms (e.g., isopropenyloxy, isobutenyloxy and 1-ethyl-2- methylvinyloxy groups), and acyloxy groups preferably having 2 to 8 carbon atoms (e.g., acetoxy, propinoxy, and butyronyloxy group).

Letter a is equal to 0 or 1.

Preferred isocyanato-containing organosilicon compounds (B) are of the following formulae.

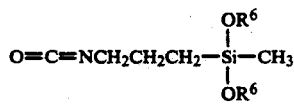

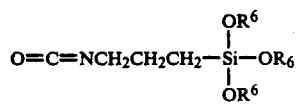

In the formulae, $R^6$ is as previously defined for $R^4$ and $R^5$.

Several preferred, but non-limiting examples of organosilicon compound (B) are given below.

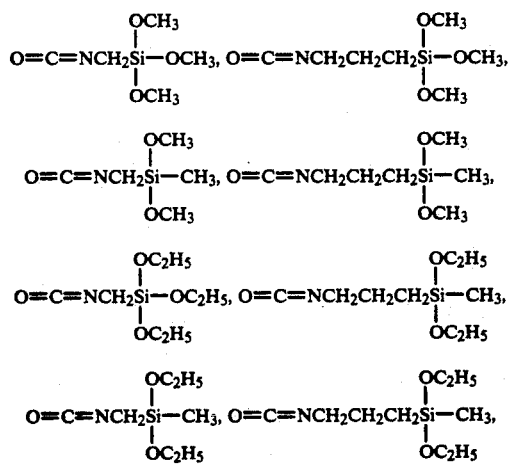

Also useful are substituted ones of the foregoing organic silicon compounds in which the hydrolyzable group is replaced by a ketoxime, alkenyloxy, acyloxy or similar group.

Component (B) is preferably blended in such amounts that the molar ratio of isocyanate group in component (B) to amino group in component (A) is at least 0.1, especially from 0.1 to 1.5.

In the present invention, component (A') which is an organopolysiloxane containing at least one group represented by the following formula:

in a molecule may be used instead of components (A) and (B).

In the above formula, $R^1$, $R^2$, $R^3$, $R^6$ and letter a are defined above.

As components (A'), organopolysiloxanes of the following formula are preferred.

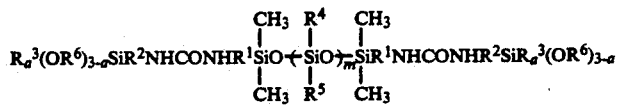

In the formula, $R^1$ to $R^6$ and letters a and m are defined above.

Examples of the organopolysiloxane (A') are described below.

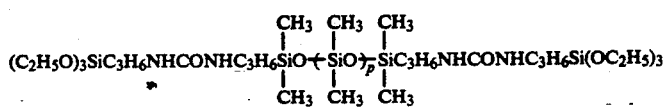

In the formula, p is 200 to 1000.

The organopolysiloxane (A') can be obtained by reacting the organopolysiloxane of component (A) with the organic silicon compound of component (B) in an amount of about 0.1 to about 2 moles, preferably about 0.8 to 1.5 moles of the isocyanate group-containing organic silicon compound (B) per 1 mole of the amino group of the amino group-containing organopolysiloxane (A). The reaction is preferably conducted at about 60° to 120° C. under a nitrogen atmosphere in a condition of isolating moisture. A catalyst is not required in general.

Component (C) is a curing catalyst for promoting curing of RTV silicone rubber compositions. Examples include tin carboxylates such as tin naphthenate, tin caprylate, and tin oleate; tin compounds such as dibutyltin diacetate, dibutyltin dioctate, dibutyltin dilaurate, dibutylin oxide, dibutyltin dimethoxide, dibutylbis(triethoxysiloxy)tin, dibutyltin benzylmaleate, and diphenyltin diacetate; and titanates and titanium chelates such as tetraethoxytitanium, tetraisopropoxytitanium, tetra-n-butoxytitanium, tetrakis(2-ethylhexoxy)titanium, dipropoxybis(acetylacetonato)titanium, and titanium isopropoxyoctylene glycol.

A basic compound may be additionally used in order to enhance the activity of the catalyst. Examples of the basic compound include amines such as octylamine and laurylamine; cyclic amidines such as imidazoline and tetrahydropyrimidine; ultra strong bases such as 1,8-diaza-bicyclo(5.4.0)undecene-7 (DBU) and guanidine; guanidyl-containing silanes such as tetramethylguanidylpropyltrimethoxysilane, tetramethylguanidylpropyldimethoxysilane, and tetramethylguanidylpropyltris(trimethylsiloxy)silane and partial hydrolyzates thereof; and guanidyl-containing siloxanes.

The amount of curing catalyst (C) blended is preferably from 0.01 to 10 parts, especially from 0.1 to 5 parts by weight per 100 parts by weight of component (A) or component (A'). Less than 0.01 parts of the curing catalyst on this basis is not practical because curing requires a long time due to less catalysis. More than 10 parts of the curing catalyst is uneconomical.

Additionally, the RTV silicone rubber composition of the present invention may contain an agent for increasing the shelf stability in uncured state and/or the ease of preparation. Useful are hydrolyzable organosilanes or partial hydrolyzates thereof such as methyltrimethoxysilane, methyltri(methylethylketoxime)silane, methyltripropenyloxysilane, and methyltriacetoxysilane and derivatives of these silane compounds in which the methyl group is replaced by a vinyl, phenyl or trifluoropropyl group. Typically used are alkoxysilanes such as methyltrimethoxysilane, methyltriethoxysilane, tetramethoxysilane, and tetraethoxysilane and partial hydrolyzates thereof.

If desired, fillers may be blended in the RTV silicone rubber composition of the present invention for reinforcement and extending purposes. Any desired one of well-known fillers may be used. Exemplary fillers are finely divided silica such as fumed silica, sintered silica, ground silica, and fused silica powder; diatomaceous earth; metal oxides such as iron oxide, zinc oxide, titanium oxide, barium oxide, and magnesium oxide; metal carbonates such as calcium carbonate, magnesium carbonate and zinc carbonate; metal hydroxides such as cerium hydroxide and aluminum hydroxide; glass fibers, glass wool, carbon black, finely divided mica, asbestos, spherical silica, spherical silsesquioxane powder, and these fillers surface treated with silane to be hydrophobic. Any other well-known additives may be blended, if desired, for example, thioxotropic agents (e.g., polyethylene glycol and its derivatives), pigments, dyes, antioxidants, anti-aging agents, anti-static agents, flame retardants (e.g., antimony oxide and chlorinated paraffin), and heat transfer modifiers (e.g., boron nitride and aluminum oxide) as well as tackifiers such as organic silicon compounds having a reactive organic group (e.g., amino, epoxy and mercapto groups) and silane coupling agents.

The RTV silicone rubber composition of the invention is preferably prepared by first mixing the organopolysiloxane (A) and the organic silicon compound (B) until a uniform mixture is obtained, and then blending the curing catalyst (C) and optional additives in the mixture.

The thus prepared RTV silicone rubber composition is applied to supports preferably after diluting the composition with a suitable solvent for ease of application. Examples of the solvent include hydrocarbon solvents such as toluene, xylene and petroleum ether, ketone solvents, and ester solvents. It is acceptable to further blend plasticizers, anti-sag agents, anti-fouling agents, preservatives, bactericides and fungicides.

EXAMPLE

Examples are given below by way of illustration and not by way of limitation. All parts are by weight.

Prior to Examples, the synthesis of organopolysiloxanes as component (A) is first described.

SYNTHESIS EXAMPLE 1

A 1-liter flask was charged with 2.48 grams of a compound of formula (1) shown below, 444 grams of octamethyltetrasiloxane, and 300 ppm of tetrabutylphosphonium hydroxide (TBPH) and heated for reaction at 120° C. under a nitrogen gas stream. After reaction for about 3 hours, the flask was heated to 170° C. and maintained at the temperature for about 30 minutes for deactivating the catalyst. There was obtained a colorless clear liquid. Analysis by gel chromatography and IR spectroscopy identified the liquid to be an organopolysiloxane of formula (2) shown below having a viscosity of 30,000 cp at 25° C. and an index of refraction of 1.401. This is designated Polymer A.

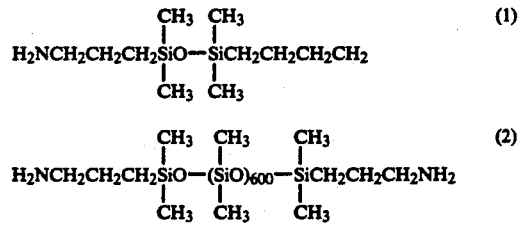

SYNTHESIS EXAMPLES 2 AND 3

The procedure of Synthesis 1 was repeated. There were obtained an organopolysiloxane of formula (3) shown below having a viscosity of 1,000 cp at 25° C. and an index of refraction of 1.400 (designated Polymer B) and an organopolysiloxane of formula (4) shown below having a viscosity of 48,000 cp at 25° C. and an index of refraction of 1.401 (designated Polymer C).

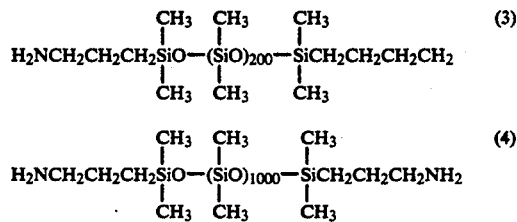

SYNTHESIS EXAMPLE 4

Polymer A prepared in Synthesis Example 1 was reacted with 4.98 g of isocyanate group-containing silane NCOC$_3$H$_6$Si(OC$_2$H$_5$)$_3$ at 120° C. for about 2 hours. There was obtained a colorless clear liquid. Analysis by gel chromatography and IR spectroscopy identified the liquid to be an organopolysiloxane of formula (5) shown below having a viscosity of 36,000 cp at 25° C. and an index of refraction of 1.403. This is designated Polymer D.

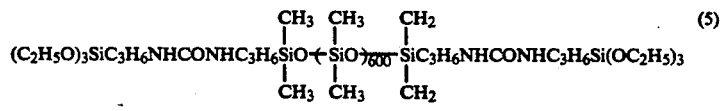

SYNTHESIS EXAMPLES 5 AND 6

The procedure of Synthesis 4 was repeated by using polymers B and C. There were obtained an organopolysiloxane of formula (6) shown below having a viscosity of 1,200 cp at 25° C. and an index of refraction of 1.402 (designated Polymer E) and an organopolysiloxane of formula (7) shown below having a viscosity of 50,000 cp at 25° C. and an index of refraction of 1.403 (designated Polymer F).

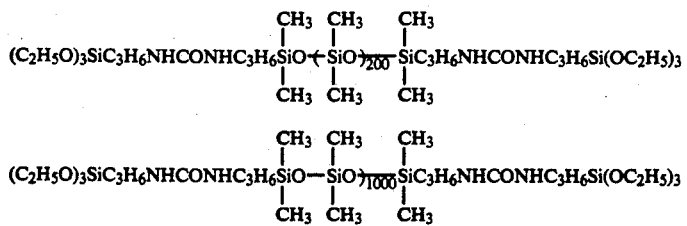

$(C_2H_5O)_3SiC_3H_6NHCONHC_3H_6Si\begin{matrix}CH_3\\|\\O\\|\\CH_3\end{matrix}\!\!\!-\!\!\!\left(\!SiO\!\right)_{\!\overline{200}}\!\!\!-\!\!\!Si\begin{matrix}CH_3\\|\\\\|\\CH_3\end{matrix}C_3H_6NHCONHC_3H_6Si(OC_2H_5)_3 \quad (6)$ $(C_2H_5O)_3SiC_3H_6NHCONHC_3H_6SiO\!-\!(SiO)_{\overline{1000}}\!-\!SiOC_3H_6NHCONHC_3H_6Si(OC_2H_5)_3 \quad (7)$

EXAMPLES 1 to 6

Using the organopolysiloxanes obtained in Synthesis Examples 1, 2 and 3 (Polymers A, B and C), compositions formulated as in Table 1 were prepared. The compositions were applied to sheets of 2 mm thick, allowed to stand for 7 days at a temperature of 20° C. and a relative humidity of 55% to cure, and measured for physical properties of the cured products in accordance with JIS K-6301. The results are shown in Table 1.

TABLE 1

| | Examples | | | | | |
|---|---|---|---|---|---|---|
| | 1 | 2 | 3 | 4 | 5 | 6 |
| Composition (pbw) | | | | | | |
| Polymer A | 100 | — | — | 100 | 100 | 100 |
| Polymer B | — | 100 | — | — | — | — |
| Polymer C | — | — | 100 | — | — | — |
| $NCOC_3H_6Si(OC_2H_5)_3$ | 1.1 | 3.3 | 0.7 | 1.7 | 1.1 | 0.5 |
| Methyltrimethyoxysilane | 5 | 5 | 5 | 5 | 5 | 5 |
| Aerogel R972* | 10 | 10 | 10 | — | — | — |
| Calcium carbonate | — | — | — | 100 | 100 | 100 |
| Tetrapropyltitanate | 1 | 1 | 1 | — | — | — |
| Dibutyltin dilaurate | — | — | — | 0.2 | 0.2 | 0.2 |
| Tetramethylguanidyl-propyltrimethoxysilane | — | — | — | 0.5 | 0.5 | 0.5 |
| Properties | | | | | | |
| Hardness, JIS A scale | 30 | 40 | 23 | 48 | 45 | 25 |
| Elongation, % | 300 | 150 | 500 | 350 | 400 | 700 |
| Tensile strength, kgf/cm² | 23 | 16 | 28 | 21 | 19 | 15 |

*manufactured and sold by Nippon Aerogel K.K.

The RTV silicone rubber compositions of Examples 4, 5 and 6 were shaped into pieces of 2 cm wide ×5 cm long ×2 mm thick which were applied to white board plates of 10 cm wide ×15 cm long and allowed to stand for 7 days at room temperature, obtaining cured samples within the scope of the invention. A comparative sample was similarly obtained from a conventional RTV silicon rubber composition (consisting of 100 parts of dimethylpolysiloxane having a degree of polymerization of 500 and terminated with a silanol group at each end, 100 parts of calcium carbonate, 5 parts of methyl-tris(methylethlketoxime)silane, and 0.2 parts of dibutyltin dilaurate). These cured samples were exposed outdoor. After the lapse of 3 months, 6 months and one year, the samples were visually observed for stain. The cured samples of the composition of Examples 4, 5 and 6 showed a substantially stain-free surface. The cured sample of the conventional composition was stained on the surface even at the end of 3-month exposure.

EXAMPLES 7 to 12

Using the organopolysiloxanes obtained in Synthesis Examples 4, 5 and 6 (Polymers D, E and F), compositions formulated as in Table 2 were prepared. The compositions were applied to sheets of 2 mm thick, allowed to stand for 7 days at a temperature of 20° C. and a relative humidity of 55% to cure, and measured for physical properties of the cured products in accordance with JIS K-6301. The results are shown in Table 2. The tack-free time of the compositions are also shown in Table 2. The compositions were also cured by allowing them to stand for 7 days in a closed container at 70° C. The physical properties are also shown in Table 2.

COMPARATIVE EXAMPLE

A composition was prepared by mixing 100 parts by weight of dimethylpolysiloxane terminated silanol groups at both ends and having a polymerization degree of 600, 10 parts of silica (Aerogel R972) and 1 part of tetrapropyltitanate. The composition was applied to sheets of 2 mm thick, allowed to stand for 7 days at a temperature of 20° C. and a relative humidity of 55% to cure, and measured for physical properties in the same manner as above. The results are shown in Table 2.

Although the composition was cured in the above condition, it was not cured by allowing it to stand for 7 days in a closed container at 70° C.

TABLE 2

| | Example | | | | | | Comparative Example |
|---|---|---|---|---|---|---|---|
| | 7 | 8 | 9 | 10 | 11 | 12 | |
| Composition (pbw) | | | | | | | |
| Polymer D | 100 | — | — | 100 | 100 | 100 | — |
| Polymer E | — | 100 | — | — | — | — | — |
| Polymer F | — | — | 100 | — | — | — | — |
| Dimethylpolysiloxane | — | — | — | — | — | — | 100 |
| Aerogel R972 | 10 | 10 | 10 | — | — | 10 | 10 |
| Calcium carbonate | — | — | — | 100 | 100 | — | — |
| Tetrapropyltitanate | 1 | 1 | 1 | — | 1 | — | 1 |
| Dibutyltin dilaurate | — | — | — | 0.5 | — | 0.2 | — |
| Tetramethyl-guanidyl-propyltri-methoxysilane | — | — | — | 1.0 | — | 0.5 | — |
| Physical property of cured product (20° C., Rh 55%, 7 days) | | | | | | | |
| Harness (JIS-A) | 30 | 40 | 23 | 48 | 55 | 40 | 28 |
| Elongation (%) | 300 | 150 | 500 | 350 | 200 | 530 | 300 |
| Tensile strength (kgf/cm²) | 23 | 16 | 28 | 21 | 15 | 24 | 21 |
| Tack-free time (min.) | 10 | 8 | 13 | 5 | 7 | 5 | 40 |
| Physical property of cured product (70° C., closed, 7 days) | | | | | | | |
| Hardness (JIS-A) | 31 | 42 | 25 | 50 | 60 | 43 | — |
| Elongation (%) | 280 | 130 | 450 | 330 | 180 | 500 | — |
| Tensile strength (kgf/cm²) | 25 | 18 | 30 | 23 | 18 | 25 | — |

There has been described a RTV silicone rubber composition which has satisfactory room temperature curing ability and cures into a product having improved heat resistance, weather resistance and adhesion. Among the benefits of the composition of the invention is that, when the composition is used as a building sealant, no stain will develop in proximity to the joint over a long time.

While the invention has been described in what is presently considered to be a preferred embodiment, other variations and modifications will become apparent to those skilled in the art. It is intended, therefore, that the invention not be limited to the illustrative embodiments, but be interpreted within the full spirit and scope of the appended claims.

I claim:

1. A room temperature vulcanizable silicone rubber composition comprising:

(A) an organopolysiloxane represented by the following formula:

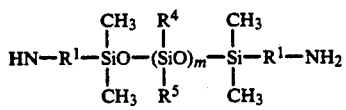

wherein $R^1$ is a substituted or unsubstituted divalent hydrocarbon group having 1 to 20 carbon atoms or a divalent organic group having 1 to 20 carbon atoms and containing an ether bond or —NH— bond, $R^4$ and $R^5$ are independently selected from substituted or unsubstituted monovalent hydrocarbon groups having 1 to 20 carbon atoms, and letter m is an integer of at least 5, (B) an organic silicon compound of either of the following formulae:

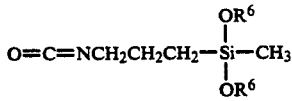

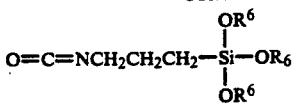

wherein $R^6$ is a substituted or unsubstituted monovalent hydrocarbon group having 1 to 20 carbon atoms, and (C) a curing catalyst.

2. The composition of claim 1 wherein components (A) and (B) are blended such that the molar ratio of isocyanate group in component (B) to amino group in component (A) is at least 0.1.

3. The composition of claim 2 which contains 0.01 to 10 parts by weight of curing catalyst (C) per 100 parts by weight of component (A).

4. A room temperature vulcanizable silicone rubber composition comprising (A') an organopolysiloxane represented by the following formula:

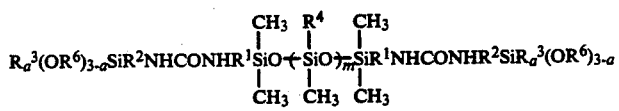

wherein $R^1$ and $R^2$ are independently selected from substituted or unsubstituted divalent hydrocarbon groups having 1 to 20 carbon atoms and divalent organic groups having 1 to 20 carbon atoms and containing an ether bond, ester bond or —NH— bond, $R^3$ and $R^6$ are independently selected from substituted or unsubstituted monovalent hydrocarbon groups having 1 to 10 carbon atoms, $R^4$ and $R^5$ are independently selected from substituted or unsubstituted monovalent hydrocarbon groups having 1 to 20 carbon atoms, and letter a is equal to 0 or 1, and letter m is an integer of 5 or more and (C) a curing catalyst.

5. The composition of claim 4 which contains 0.01 to 10 parts by weight of curing catalyst (C) per 100 parts by weight of component (A').

6. The silicon rubber composition of claim 1, wherein the organopolysiloxane component (A) has a viscosity of 25 to 500,000 centistokes at 25° C.

7. The composition of claim 2 wherein the molar ratio of isocyanate group in component (B) to amino group in component (A) is 0.1 to 1.5.

* * * * *